United States Patent Office 2,761,820
Patented Sept. 4, 1956

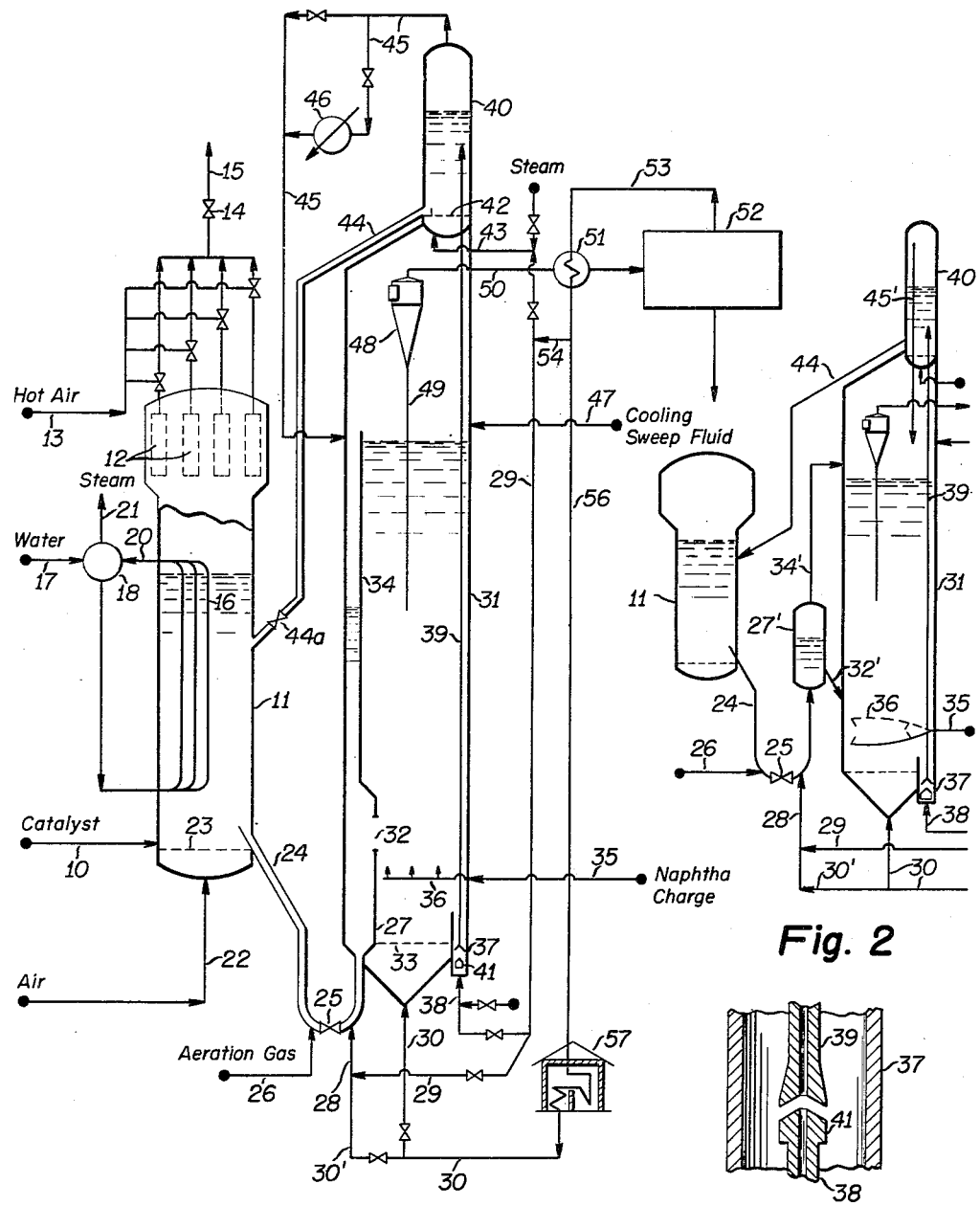
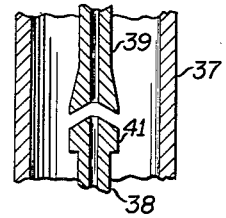
Fig. 1  Fig. 2  Fig. 3
INVENTORS:
John F. Snuggs
Charles M. Walker
BY Donald E. Payne
ATTORNEY

2,761,820

FLUID HYDROFORMING

John F. Snuggs and Charles M. Walker, Chicago, Ill., assignors to Standard Oil Company, Chicago, Ill., a corporation of Indiana Application October 27, 1951, Serial No. 253,498

7 Claims. (Cl. 196—50)

This invention relates to fluid hydroforming and it pertains more particularly to an improved method and means for treating hydrocarbons of the naphtha boiling range with solid catalyst of small particle size in the presence of hydrogen, by a fluidized solids technique for effecting hydroforming, i. e. octane number improvement, dehydrogenation, aromatization, isomerization, desulfurization, etc.

Heretofore, fluidized solids technique has been extensively employed for effecting catalytic cracking of gas oils and to some extent for effecting reforming of lower boiling hydrocarbons. Hydroforming has been commercially employed in fixed bed units and although it has often been proposed that fluidized solids technique be employed for effecting hydroforming it has been recognized that hydroforming presents certain problems that are not encountered in catalytic cracking. High catalyst to oil ratios are desirable in catalytic cracking but when employed for fluid hydroforming they result in a degradation of product quality and/or yields. Much longer contact times are required for hydroforming than are desirable for catalytic cracking and since the former process is likewise endothermic, a problem arises as to the provision of the required amount of heat in a fluid hydroforming reactor. While cracking catalyst is effective in its fully oxidized state as it leaves the regenerator, hydroforming catalyst requires some degree of reduction or conditioning. Hydroforming requires high pressures usually of the order of 100 to 500 p. s. i. which in turn creates problems of overcoming erosion and catalyst losses when catalyst-containing fluids are depressured. In catalytic cracking, if some hydrocarbon material from the reaction side gets into the regenerator, it merely burns therein, but if appreciable amounts of hydrogen should find their way into the regenerator, the operation would be more hazardous. An object of our invention is to provide a method and means for solving these and other problems presented by the application of fluidized solids technique to hydroforming.

When charging high sulfur naphtha, it has been found that when regenerated hydroforming catalyst is contacted with hydrogen, there is not only a formation of water vapor, but there is a liberation of sulfur dioxide apparently by replacement of adsorbed sulfur dioxide with hydrogen. A more specific object is to avoid the presence of water and sulfur dioxide in the dense catalyst phase in the reaction zone as well as to avoid introduction of hydrogen streams into the regeneration zone while minimizing the overall depressuring requirements.

Another object is to avoid cracking in the upper dilute phase portion of the reactor. A further object is to avoid short circuiting of regenerated catalyst back to the regeneration zone while obtaining benefit of high temperature hydrogen stripping of withdrawn catalyst. Other objects will become apparent as the detailed description of the invention proceeds.

In practicing our invention, we employ a tall vertical reactor whose height is preferably about 5 to 15 times its diameter. Superheated hydrogen, preferably a recycle gas stream, at a temperature of about 1200 to 1300° F., is introduced at the base of the reactor and distributed across the cross-sectional area thereof. Catalyst is introduced at a higher level after it has been contacted with hydrogen for the time required to reduce it to the desired lower state of oxidation. Charging stock vapors are introduced into the reactor at a level spaced from the hydrogen inlet by about .5 to 2 reactor diameters so that below the charging stock inlet the catalyst will contact only the superheated hydrogen. A deep dense phase turbulent catalyst bed is maintained in the reactor at a depth sufficient to give the required contact time which in the case of molybdena-on-alumina catalysts is approximately one minute, the ratio of charging stock to hydrogen being at least as great as heretofore employed in fixed bed operations, e. g. about 1 to 10 or about 5 mols of hydrogen per mol of charging stock introduced.

The regenerated and reconditioned catalyst is introduced at a low rate so that of materials charged to the reactor the catalyst to oil weight ratio is in the range of .1 to 1, e. g. about .35. Catalyst is withdrawn at a corresponding rate directly from the dense phase at a point below the charging stock inlet and spaced from the point of catalyst inlet so that short circuiting of regenerated catalyst may be avoided while at the same time the withdrawn catalyst will be partially stripped by superheated hydrogen immediately prior to its withdrawal. The withdrawn catalyst is preferably conveyed by steam or hot hydrogen through an internal or external riser to an elevated stripper so that the necessary catalyst head is obtained for introducing catalyst from the stripper to the regenerator. Stripping gas from the top of the stripper is returned to the dilute phase in the reactor above the dense turbulent phase and it helps to sweep out reaction products, thus minimizing product holding time in the upper part of the reactor. Cracking in the upper part of the reactor may be further minimized by cooling the stripping gas before its introduction in the upper part of the reactor and/or by introducing a portion of the liquid product or cooling water which can be vaporized in the dilute phase and thus provide some cooling in addition to providing a sweeping action for product removal.

Stripped catalyst is regenerated with an oxygen-containing gas such as air in a relatively small regenerator and the regenerated catalyst, before again contacting dense phase catalyst in the reactor, is treated with hydrogen at a temperature in the range of about 600 to 1150° F. for the period of time required for conditioning of the catalyst by bringing it to a lower state of oxidation. This conditioning or partial reduction of the regenerated catalyst may be effected in an enlarged conduit within the reaction zone itself or it may be effected in a separate vessel between the reactor and regenerator; in either case, water and $SO_2$ in the stripping gas may be introduced into the dilute phase portion of the reactor so that it does not pass through the dense catalyst phase therein. By this method of operation, no hydrogen stream is introduced into the regenerator and any catalyst particles entrained in the stripping gases are recovered without the necessity of employing additional catalyst recovery and depressuring equipment. A preferred method of operation is to introduce the partially reduced catalyst above but near the charging stock inlet and to withdraw spent catalyst at a spaced point in the reactor from a level below the charging stock inlet.

The invention will be more clearly understood from the following description of a specific example thereof read in conjunction with the accompanying drawings in which:

Fig. 1 is a schematic flow diagram of a 2,000 barrel per day fluid hydroforming unit embodying our invention;

Fig. 2 is a schematic flow diagram of an alternative system; and

Fig. 3 is a detailed section illustrating a particular catalyst lift structure.

The invention will be described as applied to the hydroforming of 53° A. P. I. naphtha of low sulfur content boiling in the range of about 200 to 330° F. having a C. F. R. R. octane number of about 60 with a molybdena-on-alumina catalyst having a particle size ranging from about 1 to 200 microns, most of the catalyst being about 20 to 100 microns in particle size. The catalyst should be as free as possible from contaminants such as iron, the preferred catalyst being made either from pure aluminum chloride by processes of the type disclosed in U. S. 2,432,286, 2,481,824, etc., or from high purity passive aluminum metal by processes of the type disclosed in U. S. 2,274,634, 2,345,600, 2,371,237, etc. The molybdena content of the catalyst should preferably be in the range of about 5 to 20 weight per cent. No invention is claimed in the catalyst per se, and it should be understood that any known hydroforming or hydrofining catalyst may be employed. The contact time and operating conditions will be dependent, of course, on the particular catalyst and its activity (as well as on the charging stock and nature of results desired); platinum-containing catalyst (U. S. 2,479,109-10) may require somewhat lower temperatures and lower contact time than molybdena-alumina catalysts. Other group VI metal oxides or sulfides on gamma-alumina supports may be employed either with or without added group VIII metal oxides or sulfides such as nickel or cobalt oxides or sulfides, examples of mixed catalysts being the so-called cobalt-molybdate catalysts, nickel-tungstate, etc., with more or less of the oxygen replaced by sulfur.

Fresh or make-up catalyst is preferably introduced into the system by line 10 into regenerator 11, which in this case may be a thermally lined vessel with about a 3 foot I. D. shell, 2 foot, 3 inch I. D. lining, 21 feet high, superimposed by a separation zone about 3 feet larger in diameter by about 5 or 6 feet in height. A number of filters 12 are provided in the upper enlarged section with provision for periodic blow back of a portion thereof with preheated air introduced through line 13, the vented catalyst-free gas being passed through reducing valve 14 and then vented by line 15 to an appropriate flue. The lower part of the regenerator 11 is provided with cooling tubes 16 so that cooling water introduced through line 17 to separator 18 flows through line 19 to a lower tube header, thence through tubes 16 and line 20, back to separator 18, the generated steam being withdrawn through line 21. Air for effecting regeneration is introduced through line 22 and is distributed across the regenerator by grid 23. In this example during normal operation about 114 mols per hour (about 3270 pounds per hour) of air is thus introduced through line 22 under a pressure of about 270 p. s. i. g. so that a dense turbulent catalyst phase is maintained with its upper level preferably below the top of tube 16 at a temperature of approximately 1100° F.

Catalyst is withdrawn from the lower part of the dense phase in the regenerator 11 above grid 23 by line or standpipe 24 in amounts regulated by valve 25, an inert aeration gas being introduced through line 26 as required. During continuous operation, the amount of catalyst thus withdrawn may be approximately 8000 pounds per hour. This catalyst is carried upwardly into preconditioning vessel 27 by means of hot hydrogen from line 28. This hot hydrogen may consist solely of preheated hydrogen recycle gas from line 29, or it may be superheated hydrogen at about 1200 to 1300° F. from line 30 and 30', or it may be a mixture thereof, it usually being desirable to effect conditioning of the catalyst at a temperature not substantially higher than about 1150° F. The preconditioning vessel 27 in this embodiment is an upwardly extending pipe about 2 feet in diameter which is within the reactor vessel 31 and which has a catalyst discharge opening 32 about 5 feet from distributor grid 33 in the lower part of the vessel. Preconditioning vessel 27 is thus of such size as to provide for partial reduction of the catalyst before the regenerated catalyst is admixed with the dense catalyst phase in reactor 31, said conditioning usually requiring at least about 5 seconds and a period of about 30 seconds being generally sufficient. During the partial reduction of the catalyst, water vapor is liberated and when the charging stock contains sulfur, SO₂ may be desorbed from the catalyst; in order to prevent the liberated water vapor and SO₂ from contacting dense phase catalyst in the reactor, a hood member 34 may be mounted above vessel 27 for by-passing the gases released in the partial reduction or conditioning step directly to the dilute catalyst phase in the upper part of the reactor. In this example, vessel 27 is a pipe having an opening 32 for catalyst discharge and an upwardly extending narrowed portion 34 for conducting gases to the top of the reactor.

Reactor 31 in this case is a lined vessel with a 5 foot 3 inch I. D. lining in about a 7 foot I. D. shell about 60 feet tall. Charging stock vapors are introduced by line 35 by any known distributing means 36 or simply at 3 or 4 spaced points at a level at least about one-half reactor diameter but within two diameters from the bottom of the reactor vessel. Thus that portion of the dense catalyst phase in the reactor which is below the charging stock inlet level 36 is contacted only with the superheated hydrogen which is introduced at the base of the vessel through line 39. Catalyst beneath the charging stock inlet is subjected to the stripping action of superheated hydrogen and at the same time the turbulence of the catalyst phase distributes the heat introduced by superheated hydrogen with remarkable uniformity throughout the dense catalyst phase.

A sump or well 37, which preferably opens above grid 33 below charging stock inlet 36 and spaced from catalyst inlet 32, provides for withdrawal of catalyst for transfer with hot hydrogen from line 38 through riser 39 to stripping chamber 40, which is preferably superimposed above the reactor. The lift gas for transferring catalyst may be steam instead of hot hydrogen. Riser 39 may be a 2 inch pipe flared and reinforced at its bottom to cooperate with tapered plug 41 which may be moved toward or away from the bottom of pipe 39 and through which the carrier gas is introduced, as shown in greater detail in Fig. 3. It should be understood, of course, that an external riser line may be employed instead of an internal line for conveying catalyst from the lower part of the reactor to the stripper preferably at an intermediate level therein.

The stripper or spent catalyst hopper 40 may be approximately 2 feet in diameter by about 26 feet in height and may be provided with a distributor grid 42 at its base and an inlet 43 for introducing steam, hot hydrogen or inert gas to serve as an aeration or additional stripping medium. Stripped catalyst flows from the lower part of the stripper through standpipe line 44 and control valve 44a preferably to an intermediate level in regenerator 11. Overhead gas from the stripper passes by line 45 to the upper part of the reactor 31 above the dense phase level therein and if desired it may be passed through cooler 46 for lowering the temperature of the dilute phase in the reactor so that thermal cracking will be minimized. A quench liquid such for example as a portion of the liquid product or even water may be introduced above the dense phase through line 47 for vaporization and removal with the product stream to serve the double purpose of cooling the reaction products and minimizing their residence time in the upper part of the reactor.

Reaction products are withdrawn from the upper part of the dilute phase in reactor 31 through cyclone separator 48, dip leg 49 of which extends into the dense phase for returning separated catalyst particles thereto. The product stream then passes through line 50 and heat exchanger 51 to product recovery system 52 in which recycle hydrogen containing at least about 60% hydrogen is separated at substantially reaction pressure and recycled by line 53 through heat exchanger 51 for heating it to a temperature which in this case is approximately 700° F. This recycled hydrogen stream provides the hot hydrogen for introduction through line 29, and optionally through lines 38 and 43, and line 29 may communicate with line 53 by line 54. Most of the hot recycled hydrogen passes through line 56 to hydrogen superheater 57 wherein the hydrogen is superheated to a temperature of about 1200 to 1300° F. for return by line 30 to the base of the reactor.

In this example, the naphtha charge is introduced at a temperature of about 850 to 1050° F., e. g. about 950° F., at the rate of approximately 2000 barrels per day or approximately 22,350 pounds per hour. Superheated hydrogen is introduced at the base of the reactor at about 1200 to 1300° F. at the rate of about 1300 mols per hour or approximately 18,000 pounds per hour. The reactor bed depth in this case is about 54 feet and its average temperature about 930° F., the upward gas velocity being in the range of .5 to 1.5 or in this case .84 feet per second to give a catalyst bulk density of about 30 pounds per cubic foot. Thus the charging stock contact time is approximately one minute, the weight space velocity being about .45. From the pressure balance standpoint, the pressure immediately above grid 23 and regenerator 11 may be about 265 p. s. i. g., immediately above the grid in the reactor about 261 p. s. i. g., at the top of the reactor (and top of the stripper) about 250 p. s. i. g., at the bottom of the stripper about 254 p. s. i. g., at the bottom of transfer line or standpipe 44 about 268 p. s. i. g. (immediately above control valve 44a at point of aeration), and at the top of the regenerator about 261 p. s. i. g. It will be understood, of course, that control valves and aeration line will be employed in accordance with usual fluidized solids practice throughout the system.

Since no invention is claimed in the product recovery system per se, it requires no detailed description. Generally speaking, however, the product stream after passage through heat exchanger 51 may be further cooled by heat exchange with incoming charge and introduced into a baffled scrubbing section in a fractionating tower operating at substantially reaction pressure (about 240 p. s. i. g.) and with a top temperature of 270° F. and a bottom temperature of 420° F. Catalyst particles are removed in heavy condensate and may be recycled to the reactor. The overhead from this fractionator may then be condensed and the recycle hydrogen separated therefrom for compression and recycling through heat exchanger 51. So-called "polymer" may be recovered from high boiling material leaving the first fractionator and the unrecycled portion of the separated hydrogen may be scrubbed with incoming charging stock for recovery of gasoline boiling range components therein. The charging stock is then vaporized and heated to a temperature of about 900° to 1050° F. for introduction into the reactor as hereinabove described.

In the system herein described, the dry gas production may be about 12 weight per cent, polymer about 3.5 weight per cent, and butane-containing gasoline about 84 weight per cent, the coke formation being only about .5 weight per cent, about 10% of the total gasoline fraction being butanes. The product gasoline is substantially free from sulfur and has a C. F. R. R. octane number of about 95 to 100 (based on product gasoline containing only a small part of the butanes with a maximum boiling point of 400° F. and a 90% point of about 300° F.).

In Fig. 2, the system is essentially as described in connection with Fig. 1 except that the catalyst conditioning vessel 27' is outside of the reactor, catalyst being introduced from the conditioning vessel 27' to the reactor by conduit 32' and conditioning gases containing water and $SO_2$ being introduced to the upper part of the reactor by line 34'. Also in this example, the stripping gas from the upper part of the stripper 40 is returned to the space above the dense phase in the reactor by internal line 45'. Other modifications and alternative arrangements of apparatus will be apparent from the above description to those skilled in the art.

While in the above examples a light naphtha is contacted with a molybdena-alumina catalyst at a temperature of approximately 930° F. in the reactor, it will be understood that the temperature, pressure, catalyst to oil ratios and space velocities will be dependent on the particular charging stocks and catalysts employed and upon the nature and degree of hydroforming which is to be attained.

We claim:

1. The method of effecting fluid hydroforming which comprises superheating a hydrogen gas stream to a temperature of about 1200 to 1300° F. and introducing the superheated stream at the base of a reaction zone having a height about 5 to 15 times its diameter, distributing the superheated hydrogen across the base of said zone into a unitary fluidized catalyst bed which extends to the upper part of the reaction zone, introducing superheated charging stock vapors containing a small amount of sulfur directly into said bed at a level spaced from the hydrogen inlet by about one-half to two reactor diameters, introducing conditioned catalyst at the lower part of the catalyst bed, employing an upward gas velocity in the reaction zone to maintain the catalyst in dense phase fluidized condition and to give a bed depth for obtaining effective hydroforming of the charging stock at a temperature in the range of about 850 to 1000° F. under a pressure of about 100 to 500 p. s. i. g., withdrawing catalyst from the dense phase at a level below the charge inlet and from a point spaced from the catalyst inlet, conveying the withdrawn catalyst to a stripping zone and contacting it therein with a stripping gas, introducing gas from the upper part of the stripping zone to the upper part of the reaction zone above the dense phase level therein, withdrawing catalyst from the stripping zone and introducing it into a regeneration zone below a dense phase catalyst level therein, burning deposits from the catalyst with an oxygen-containing gas in the regeneration zone, removing catalyst from gases leaving the upper part of the regeneration zone prior to depressuring said gases, withdrawing catalyst from the regeneration zone to a conditioning zone, contacting catalyst with hot hydrogen for at least about 5 seconds in the conditioning zone for displacing oxygen, water and sulfur dioxide from the regenerated catalyst, and introducing gases from the upper part of the conditioning zone directly to the upper part of the reaction zone above the dense phase catalyst level so that both the conditioned catalyst introduced at the lower part of the reaction zone and gases introduced therewith will be substantially free from oxygen, water and sulfur dioxide.

2. The method of claim 1 which includes the step of cooling the gas from the upper part of the stripping zone before it is introduced above the top of the dense phase in the reaction zone.

3. The method of claim 1 which includes the step of introducing a cooling fluid into the reaction zone immediately above the dense phase level therein.

4. Apparatus for effecting fluid hydroforming which apparatus comprises a tall insulated reactor designed to withstand high pressure and having a height about 5 to 15 times its diameter, a product outlet at the upper part of the reactor, a distributing grid at the base of said reactor, a charging stock inlet above the distributor grid and about one-half to two reactor diameters above the base of the reactor, a catalyst withdrawal well opening above the distributor grid but below the charging stock inlet, an accumulator vessel mounted at a high level with respect to said reactor, a transfer line leading from said well to said accumulator vessel, connections for introducing a carrier gas into said transfer line, a conduit leading from the top of the accumulator vessel to the upper part of the reactor, a regenerator, a standpipe leading from the lower part of the accumulator vessel to a low point in the regenerator, an inlet line for introducing air at the base of the regenerator, catalyst separators at the top of the regenerator and lines for withdrawing catalyst-free flue gas from the top of said separators, a catalyst conditioning vessel of smaller diameter than the reactor, a standpipe for introducing catalyst from a low point in the regenerator (spaced from the low point of catalyst introduction thereto) to said conditioning vessel, heating means comprising at least one heater for heating recycled hydrogen, a conduit for introducing at least a part of said heated recycled hydrogen from said heating means to the base of said conditioning vessel, a conduit from said heater for introducing at least a part of said heated recycled hydrogen at the base of the reactor, a discharge opening in said conditioning vessel for introducing conditioned catalyst therefrom above the charging stock inlet but in the lower part of the reactor, said last named opening being spaced from said well to prevent catalyst short circuiting, and a connection for introducing a gas at the bottom of said accumulator vessel.

5. The apparatus of claim 4 which includes a cooler for cooling gases introduced from the top of the accumulator vessel to the upper part of the reactor.

6. The apparatus of claim 4 wherein the heating means includes a first hydrogen heater for heating hydrogen to about 700° F., a second hydrogen heater for heating hydrogen to at least about 1200° F., and connections for introducing hydrogen from both heaters to said conditioning vessel.

7. Apparatus for effecting fluid hydroforming which apparatus comprises a tall insulated reactor designed to withstand high pressure and having a height about 5 to 15 times its diameter, a product outlet at the upper part of the reactor, a distributing grid at the base of said reactor, a charging stock inlet above the distributor grid and about one-half to two reactor diameters above the base of the reactor, a catalyst withdrawal well opening above the distributor grid but below the charging stock inlet, an accumulator vessel mounted at a high level with respect to said reactor, a transfer line leading from said well to said accumulator vessel, connections for introducing a carrier gas into said transfer line, a conduit leading from the top of the accumulator vessel to the upper part of the reactor, a regenerator, a standpipe leading from the lower part of the accumulator vessel to a low point in the regenerator, an inlet line for introducing air at the base of the regenerator, catalyst separators at the top of the regenerator and lines for withdrawing catalyst-free flue gas from the top of said separators, a catalyst conditioning vessel of smaller diameter than the reactor, a standpipe for introducing catalyst from a low point in the regenerator (spaced from the low point of catalyst introduction thereto) to said conditioning vessel, heating means comprising at least one heater for heating recycled hydrogen, a conduit for introducing at least a part of said heated recycled hydrogen from said heating means to the base of said conditioning vessel, a conduit from said heater for introducing at least a part of said heated recycled hydrogen at the base of the reactor, a discharge opening in said conditioning vessel for introducing conditioned catalyst therefrom above the charging stock inlet but in the lower part of the reactor, said last named opening being spaced from said well to prevent catalyst short circuiting, and a conduit for conveying gases from the upper part of the conditioning vessel directly to the upper part of the reactor.

References Cited in the file of this patent
UNITED STATES PATENTS

| | | |
|---|---|---|
| 2,366,372 | Voorhees | Jan. 2, 1945 |
| 2,409,353 | Giuliani et al. | Oct. 15, 1946 |
| 2,409,690 | Nicholson et al. | Oct. 22, 1946 |
| 2,414,002 | Thomas et al. | Jan. 7, 1947 |
| 2,425,807 | Jahnig | Aug. 19, 1947 |
| 2,447,116 | Collins | Aug. 17, 1948 |
| 2,471,064 | Hall et al. | May 24, 1949 |
| 2,472,844 | Munday et al. | June 14, 1949 |
| 2,477,740 | Grote | Aug. 2, 1949 |
| 2,497,940 | Hemminger | Feb. 21, 1950 |
| 2,597,346 | Leffer | May 20, 1952 |